Patented Aug. 9, 1927.

1,638,643

UNITED STATES PATENT OFFICE.

HANS SCHLOSSTEIN, OF CHICAGO, ILLINOIS.

MEDIUM FOR TREATING OILS AND METHOD OF MAKING THE SAME.

No Drawing.   Application filed February 25, 1927.   Serial No. 171,082.

The present invention relates to mediums for cracking, refining or otherwise treating hydrocarbon oils and coal tar oils; and it has for its object to produce a medium possessing the most advantageous physical and chemical forms for containing a stable hypochlorous salt composition having a large amount of available chlorine.

In carrying out my invention I employ bentonite or other hydrous-alumino-silicate as the base and the vehicle for carrying the chlorine compounds in somewhat the same manner as in my prior Patent No. 1,582,086 for an antiseptic and disinfectant compound. By adding to my improved medium a suitable soluble acid, my improved compound may be given antiseptic and disinfecting properties; and, therefore, viewed in one of its aspects, my invention may be regarded as having for its object to produce a compound or medium that is an improvement on the one disclosed in my aforesaid patent.

In producing my improved medium, I form a jelly by immersing a highly colloidal bentonite clay or other hydrous-aluminosilicate in water. To this jelly-like substance is added a solution of magnesium chloride or magnesium chloride in crystalline form adapted to dissolve in the water contained in the jelly. The mixture is treated, usually for a period of somewhat less than an hour, with chlorine gas by any usual or suitable absorption process. While this treatment is going on a quantity of sodium hydroxide is added to the mixture. The reactions that take place produce in the jelly a hypochlorous compound consisting of magnesium hypochlorite combined and of double salts of aluminum and magnesium hypochlorites.

The resulting product is dried by evaporating the moisture at as low a temperature as possible. The resulting product is very stable, much more so than compounds of bentonite and sodium hypochlorite or other similar compositions of which I am aware, and possesses a much larger percentage of available chlorine than such other compounds. Thus, for example, sodium hypochlorite cannot be produced in solid form and in liquid form is very unstable, while magnesium hypochlorite is a solid and, at ordinary temperatures, quite stable. So far as the amount of available chlorine is concerned it should be noted that the most concentrated sodium hypochlorite contains about twelve percent of available chlorine, while the amount in commercial sodium hypochlorite is much less than that and the amount that would be found in comparatively unstable sodium hypochlorite in a medium of the general character as the present invention would be only three or four percent; whereas magnesium hypochlorite contains up to twenty percent of available chlorine and because of its stability the magnesium hypochlorite affords permanently that amount of available chlorine in my improved product.

When my improved product is added to oil that is being refined, the heat of the refining process liberates the chlorine which acts as a catalyst and aids in the cracking of the oil.

In order that my improved product may be used for antiseptic or disinfecting purposes, a water soluble acid in powdered form or some chemical compound that will develop acid upon immersion in water may be added to the dried product.

I claim:

1. A hydrous-alumino-silicate containing magnesium hypochlorite combined therewith and double salts of aluminum and magnesium hypochlorites.

2. A hydrous-alumino-silicate admixed with the reaction product of magnesium chloride, sodium hydroxide and chlorine.

3. A hydrous-alumino-silicate containing magnesium hypochlorite combined therewith and double salts of aluminum and magnesium hypochlorites, and containing also an antiseptic and disinfecting substance.

4. An oil treating medium, produced by mixing magnesium chloride in a hydrous-alumino-silicate jelly, treating the mixture with chlorine, and adding sodium hydroxide to the mixture during the treatment thereof with chlorine.

5. An oil treating medium, produced by mixing magnesium chloride in a hydrous-alumino-silicate jelly, treating the mixture with chlorine, and adding sodium hydroxide to the mixture during the treatment thereof with chlorine, and drying the resulting product.

In testimony whereof, I sign this specification.

HANS SCHLOSSTEIN.